(12) United States Patent
Kamath et al.

(10) Patent No.: US 10,554,664 B2
(45) Date of Patent: Feb. 4, 2020

(54) ACTIVITY FEED FOR HOSTED FILES

(71) Applicant: Microsoft Technology Licensing, LLC, Redmond, WA (US)

(72) Inventors: Kristen Kamath, Bellevue, WA (US); Kirk Robert Myhre, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 339 days.

(21) Appl. No.: 15/199,681

(22) Filed: Jun. 30, 2016

(65) Prior Publication Data

US 2017/0318020 A1 Nov. 2, 2017

Related U.S. Application Data

(60) Provisional application No. 62/330,825, filed on May 2, 2016.

(51) Int. Cl.
| | | |
|---|---|---|
| *H04L 29/06* | (2006.01) | |
| *G06F 16/13* | (2019.01) | |
| *G06F 16/176* | (2019.01) | |
| *G06F 16/182* | (2019.01) | |
| *G06F 16/9535* | (2019.01) | |

(52) U.S. Cl.
CPC .......... *H04L 63/102* (2013.01); *G06F 16/13* (2019.01); *G06F 16/176* (2019.01); *G06F 16/183* (2019.01); *G06F 16/9535* (2019.01); *H04L 63/0876* (2013.01); *H04L 67/42* (2013.01)

(58) Field of Classification Search
CPC ... H04L 63/102; H04L 63/0876; H04L 67/42; G06F 17/30091; G06F 17/30165; G06F 17/30203; G06F 17/30867; G06Q 10/101
See application file for complete search history.

(56) References Cited

U.S. PATENT DOCUMENTS

| | | | |
|---|---|---|---|
| 6,622,116 B2 | 9/2003 | Skinner et al. | |
| 6,918,082 B1 | 7/2005 | Gross et al. | |
| 7,849,052 B2 | 12/2010 | Vicars et al. | |
| 8,825,597 B1* | 9/2014 | Houston | H04L 67/06 707/610 |
| 2007/0094312 A1 | 4/2007 | Sim-Tang | |
| 2007/0255579 A1 | 11/2007 | Boland et al. | |
| 2007/0271303 A1 | 11/2007 | Menendez et al. | |
| 2008/0256138 A1 | 10/2008 | Sim-Tang | |
| 2009/0024674 A1 | 1/2009 | Gallagher | |

(Continued)

FOREIGN PATENT DOCUMENTS

WO 2014063030 A1 4/2014

OTHER PUBLICATIONS

"International Search Report and Written Opinion for PCT Patent Application No. PCT/US2017/029537", dated Jun. 9, 2017, 13 pages.

(Continued)

*Primary Examiner* — Hee K Song
(74) *Attorney, Agent, or Firm* — Medley, Behrens & Lewis, LLC

(57) ABSTRACT

Described herein are various technologies pertaining to generating an activity feed for an entity hosted at a file hosting server. The activity feed includes a plurality of entries that are representative of activities undertaken with respect to the entity over time.

20 Claims, 14 Drawing Sheets

(56) References Cited

U.S. PATENT DOCUMENTS

| | | | |
|---|---|---|---|
| 2009/0144283 A1 | 6/2009 | Clark et al. | |
| 2011/0238754 A1* | 9/2011 | Dasilva | G06F 17/3082 709/204 |
| 2012/0317239 A1* | 12/2012 | Mulder | G06Q 10/101 709/219 |
| 2013/0066876 A1 | 3/2013 | Raskino et al. | |
| 2014/0101310 A1* | 4/2014 | Savage | H04W 4/003 709/224 |
| 2014/0280463 A1 | 9/2014 | Rian et al. | |
| 2016/0028796 A1* | 1/2016 | Garcia | G06F 3/0482 715/738 |
| 2016/0070717 A1* | 3/2016 | Bergner | G06F 17/30174 707/638 |
| 2017/0090704 A1* | 3/2017 | Hu | G06F 3/0484 |

OTHER PUBLICATIONS

"FileRun", Published on: Oct. 6, 2015, Available at: <<http://www.filerun.com/features>>, 7 pages.

"Google: Drive Help", Retrieved on: Apr. 25, 2016, Available at: <<https://support.google.com/drive/answer/2409045?hl=en&rd=1>>, 2 pages.

"Dropbox", Retrieved on: Apr. 25, 2016, Available at: <<https://webcache.googleusercontent.com/search?q=cache:HzQomUBicXsJ:https://www.dropbox.com/guide/business/manage-files/comments+&cd=1&hl=en&ct=clnk&gl=in>>, 3 pages.

"FileRun—Demo", Retrieved on: Apr. 25, 2016, Available at: <<https://demo.filerun.com/#/HOME/Pictures>>, 5 pages.

* cited by examiner

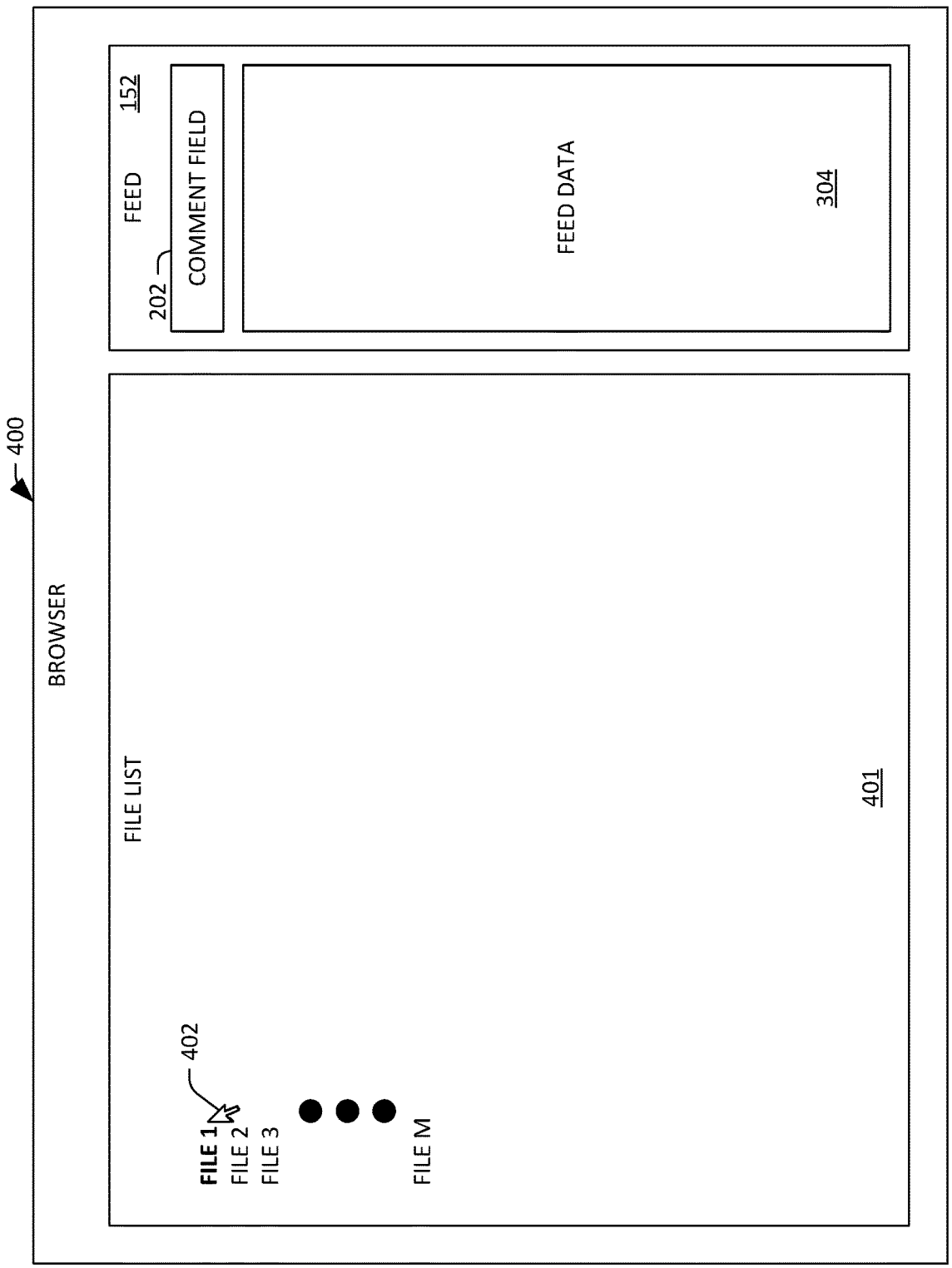

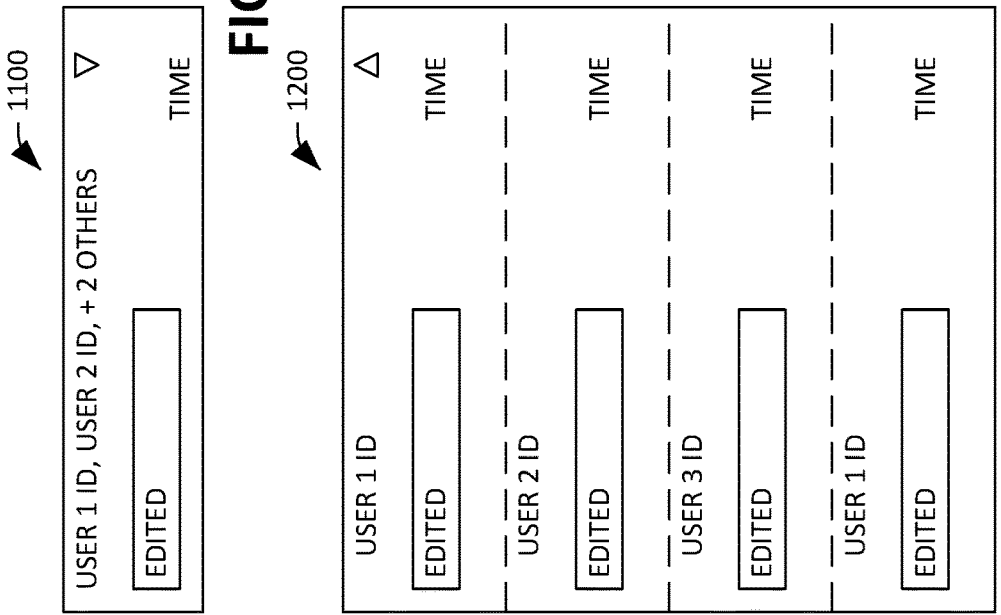
FIG. 11
FIG. 12
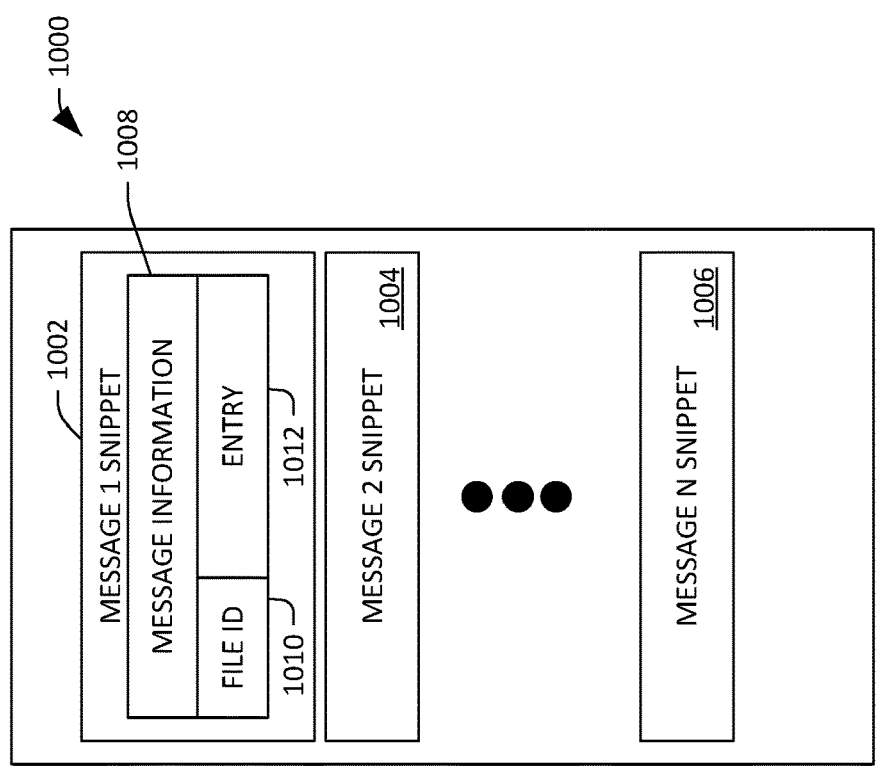
FIG. 10

ACTIVITY FEED FOR HOSTED FILES

RELATED APPLICATION

This application claims the benefit of U.S. Provisional Patent Application No. 62/330,825, filed on May 2, 2016, and entitled "ACTIVITY FEED FOR HOSTED FILES", the entirety of which is incorporated herein by reference.

BACKGROUND

File hosting applications are configured to facilitate storage of files (which include word processing documents, spreadsheets, presentations, images, videos, and so forth) in network-accessible file hosting servers, rather than on client computing devices. Transitioning storage from client computing devices to server computing devices has facilitated user collaboration on files hosted at the server computing devices. For example, per a user request set forth to a file hosting application, a file hosting server can host a file. This file may then be shared with other users who can (sometimes simultaneously) access, edit, delete, comment upon, share, or undertake some other activity with respect to the file.

Conventionally, however, these file hosting services provide very little information about the overall history of files that are hosted at the file hosting server. More specifically, with respect to a hosted file, a conventional file hosting application can provide the user with a small amount of information about the history of the file—for instance, the file hosting application can inform the user that the file has been edited, but fails to provide any context surrounding the edit. From the user's perspective, acquiring additional information about the history of the file is labor- and time-intensive.

SUMMARY

The following is a brief summary of subject matter that is described in greater detail herein. This summary is not intended to be limiting as to the scope of the claims.

Described herein are various technologies pertaining to presenting an activity feed for an entity, wherein the entity is hosted at a hosting server that is accessible to multiple client computing devices by way of network connections. The hosting server executes a hosting application, wherein entities (e.g., files, file folders, etc.) are accessible by way of the file hosting application. For instance, end users who are authorized to access a file hosted at the file hosting server can view, edit, share, and/or perform some other activity by way of the file hosting application.

The above-referenced activity feed for an entity includes a plurality of entries, wherein each entry represents an activity performed with respect to the entity by an end user who is authorized by the file hosting application to access the entity. With more specificity, each entry in the activity feed can include: 1) an identity of a type of activity represented by the entry, wherein exemplary activity types include, but are not limited to, "created", "viewed", "edited", "commented", "shared", "moved", "copied", etc.; 2) an identity of a user who performed the activity with respect to the entity; 3) a time when the activity was performed; and 4) optionally, a portion of content related to the activity. For instance, for an entry in an activity feed that represents an activity of the type "commented", the entry can include at least a portion of the comment. Further, when a comment is made inside a file, an entry in the activity feed that represents the comment can include a portion of the comment. Finally, one or more entries in the activity feed can have a version identifier included therein, which identifies a version of the entity corresponding to the activity represented by the entity. The version identifier may be selectable, where selection of the version identifier can cause the version of the entity represented by the version identifier to be presented on a display (e.g., the entity is "rewound" to the selected version). Thus, the activity feed provides the end user with a robust history of the entity, such that the end user is quickly able to understand context surrounding activities performed on the entity (possibly by several different users) over time.

Further, the entries can be ordered in a sequence that corresponds to the sequence in which activities represented by the entries were undertaken on the entity, with a most recent activity represented by an entry positioned at the top of the activity feed.

BRIEF DESCRIPTION OF THE DRAWINGS

FIG. 4 is an exemplary graphical user interface that includes a list of file identifiers and an activity feed for a file represented by a selected file identifier in the list of file identifiers.

FIG. 10 is an exemplary graphical user interface of an email application, where a file identifier for a file referenced in the email has an activity identifier shown therewith.

FIG. 11 is an exemplary graphical user interface that depicts at least a portion of an activity feed, where activities are aggregated in the activity feed based upon a selected type of activity.

FIG. 12 is an exemplary graphical user interface that depicts at least a portion of an activity feed, where the activity feed is expanded to depict individual entries.

DETAILED DESCRIPTION

Figure 1:
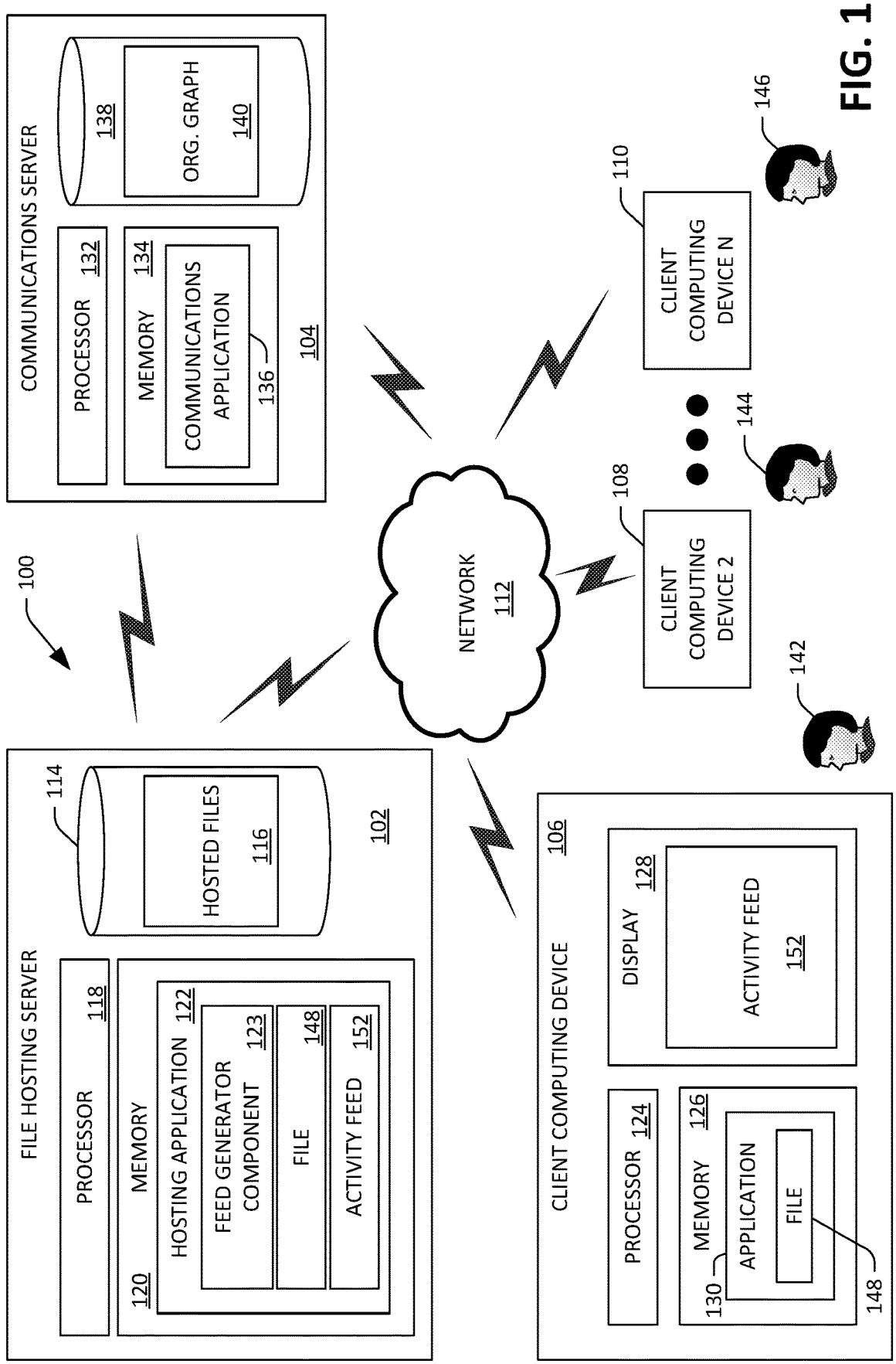
FIG. 1 is a functional block diagram of an exemplary system that facilitates generating and maintaining activity feeds for files hosted at a file hosting server.

Various technologies pertaining to creating and maintain an activity feed for an entity (e.g., a file or file folder) hosted at a file hosting server are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or," That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates creating, maintaining, and presenting activity feeds with respect to entities (e.g., files and/or folders) hosted by a file hosting server (and subject to collaboration) is illustrated. The system 100 includes a file hosting server 102, a communications server 104, and a plurality of client computing devices 106-110, wherein the client computing devices 106-110 are in communication with the file hosting server 102 and the communications server 104 by way of a network 112. The file hosting server 102 includes a data store 114 that stores hosted files 116, which may be organized across file folders. The hosted files 116 can include files of any suitable type, including, but not limited to, word processing documents, spreadsheet files, presentation files, images, videos, audio files, executable files, and so forth. The file hosting server 102 additionally includes at least one processor 118 and memory 120, wherein the memory 120 stores instructions that are executed by the processor 118. In the exemplary system 100, the memory 120 has a file hosting application 122 loaded therein, where the file hosting application 122 is configured to effectuate hosting of the hosted files 116 at the file hosting server 102 and to further effectuate providing a collaborative computing environment where the hosted files 116 can be collaborated upon by users of multiple client computing devices.

With more detail, the hosting application 122 is configured to perform several functions. These functions include, but are not limited to including, maintaining indices pertaining to the hosted files 116 in the data store 114, hosting applications that are usable to open at least some files in the hosted files 116 (e.g., such as a word processing application), maintaining metadata with respect to files in the hosted files 116, providing a tool that allows end-users to generate metadata about files in the hosted files 116, authenticating users who attempt to access one or more files in the hosted files 116, creating and enforcing permission restrictions for files in the hosted files 116 (e.g., ensuring that a user requesting access to a hosted file is authorized to access the hosted file, is authorized to edit the file, etc.), amongst other functions.

The hosting application 122 includes a feed generator component 123 that is configured to generate and maintain activity feeds for respective entities hosted at the file hosting server 102. As noted above, these entities can include files and/or file folders. While many of the examples set forth herein are provided with respect to files, it is to be understood that many of these examples are also applicable to file folders. An activity feed includes time-ordered entries, wherein the entries are representative of activities undertaken on a hosted entity (possibly by several users) over time. In other words, entries in the activity feed for an entity are arranged in a sequence, where the sequence corresponds to a sequence in which activities were undertaken with respect to the entity. Further, the activity feed may include version information that indicates different versions of the entity over time, such that each entry in the activity feed corresponds to a certain version of the hosted entity.

The feed generator component 123 can generate entries that are representative of several different types of activities, such as creation of an entity, editing of an entity, assignation of a tag (metadata) to an entity, emailing of an entity, alteration in metadata of an entity, renaming of an entity, sharing of an entity (through a sharing mechanism provided by the file hosting application 122), changing location of an entity (e.g., from one folder to another), deleting of an file, assigning a task with respect to an entity, viewing of an entity by a new user, commenting on an entity (e.g., by way of an application used to edit an entity or by way of the file hosting application 122), commenting on an entity by way of a social media application, etc. Further, as indicated above, the feed generator component 123 can associate each entry in the activity feed with a particular version of the file, wherein any suitable logic can be employed to differentiate between file versions. For instance, a new version of the file can be identified by the file hosting service when a user edits and then saves the file.

The client computing device 106 includes at least one processor 124 and memory 126 that stores instructions that are executed by the at least one processor 124. The client computing device 106 further includes a display 128 that presents graphical data thereon. As will be described in greater detail below, the memory 126 has an application 130 loaded therein, wherein the application 130 may be a browser, a word processing application, a spreadsheet application, a presentation application, an image viewing application, or the like. It is to be understood that the client computing device 106 may be any suitable type of computing device, such as a laptop computing device, a tablet computing device, a desktop computing device, a mobile telephone, a wearable computing device (such as a fitness band, a watch, etc.), a head-mounted computing device, etc. Further, the client computing device 106 may be a first type of computing device, while the client computing devices 108-110 may be of different types.

The communications server 104 includes at least one processor 132 and memory 134 that stores instructions that are executed by the at least one processor 132. The memory 134 comprises a communications application 136 that facilitates exchanging electronic messages amongst and between the client computing devices 106-110. For instance, the communications application 136 can be an email application, an instant messaging application, a telephone application, a unified communications (UC) application, or the like. The communications server 104 includes a data store 138 that includes an organizational graph 140. The organizational graph identifies users in an organization (enterprise) as well as roles of the users in the organization. For example, the organizational graph 140 can indicate that a user 142 of the client computing device 106 is a team leader, while the users 144-146 of the client computing devices 108-110 may be members of the team led by the user 142.

Exemplary operations of the feed generator component 123 with respect to an entity (e.g., file) hosted at the file hosting server 102 is now described. The client computing device 106 can receive an indication from the user 142 that the file hosting server 102 is to be accessed by the client computing device 106. For example, the user 142 may initiate a web browser on the client computing device 106 and direct the web browser to a URL corresponding to the file hosting server 102. In another example, the user 142 may initiate an application on the client computing device 106 that is dedicated to accessing the file hosting server 102 (and dedicated to communicate with the hosting application 122). In yet another example, the user 142 can set forth a voice command that pertains to the file hosting server 102.

The client computing device 106 may also receive an indication that the user 142 of the client computing device 106 is creating a new file, and the client computing device 106 transmits data to the file hosting server 102 that causes the new file to be retained as a hosted file in the hosted files 116. For example, the application 130 may be a web browser, and the web browser 130 is loaded into the memory 126. The processor 124 executes the web browser, and directs the web browser to a URL, corresponding to the file hosting server 102. The hosting application 122 ascertains that the web browser is requesting data maintained by the hosting application 122, and the hosting application 122 syncs with the application 130 executing on the client computing device 106. Based upon input from the user 142, a file 148 is created at the client computing device 106; as the application 130 is synced with the hosting application 122, the hosting application 122 creates an instance of the file 148 at the file hosting server 102.

The feed generator component 123 identifies that the file 148 has been created, and the feed generator component 123 creates an activity feed 152 for the file 148. The feed generator component 123 can generate the activity feed 152 as metadata that is assigned to the file 148 (rather than as a portion of the file itself). When the feed generator component 123 has access to APIs for the application 130 used to create the file, however, the feed generator component 123 may alternatively store the activity feed 152 as a portion of the file 148. Continuing with the exemplary scenario set forth above, the feed generator component 123, when creating the activity feed 152, can include an entry that is representative of the activity type "creating a file", where the entry includes an identity of the user 142 who performed the activity (created the file), a description of the activity, time of occurrence of the activity, and a version of the file 148 (e.g., version 1).

Subsequent to creating the file, the user 142 can (through interaction with the client computing device 106) indicate that the hosted file 148 is to be shared with the users 144-146. The feed generator component 123 can update the activity feed 152 to include an entry that represents the activity of sharing the file with the users 144-146 (who previously were unable to access the file by way of the file hosting application 122), where the entry identifies a type of the activity (share), identifies the user who performed the activity (the user 142), identifies the users with whom the file has been shared (the users 144-146), a time of the activity, etc.

The file hosting server 102 can transmit data to the client computing devices 108-110 that indicates that the file 148 has been shared with the users 144-146 of the client computing devices 108-110 and is accessible by way of the file hosting application 122. The user 144 of the client computing device 108 may direct the client computing device 108 to access the hosted file 148 (e.g., the user 144 directs the client computing device to communicate with the hosting application 122). The user 144, by way of the client computing device 108, may then edit the hosted file 148, wherein edits made to the file 148 include comments made in the application used to edit the file 148. The user 144 may then indicate that the file 148 is to be saved at the file hosting server 102.

The feed generator component 123 can update the activity feed 152 to include several entries. For instance, the feed generator component 123 can generate a first entry that indicates that the user 144 has edited the file 148, and further indicates that such edits resulted in creation of a new version of the file 148. The first entry can further optionally include data about the edit, such as where the edit occurred in the file. The feed generator component 123 can also generate a second entry that indicates that the user 144 has commented in the hosted file 148. The second entry can further include at least a portion of the comment itself (e.g., the feed generator component 123 can extract the comment from the file 148).

Subsequent to saving the file, the user 144 can cause the client computing device 108 to transmit an electronic communication to the client computing device 110 (operated by the user 146) by way of the communications server 104, wherein the electronic communication includes or references the file 148. As the communications server 104 and the file hosting server 102 are in communication with one another, the communications server 104 can determine that the users 144-146 are on the same team (through analysis of the organizational graph 140), and can indicate to the file hosting server 102 that a communication about the file 148 has been transmitted from the user 144 to the user 146. The feed generator component 123 can update the activity feed 152 to include another entry, where such entry can include: 1) an indication that the user 144 transmitted the electronic communication about the file; 2) that the user 146 received the electronic communication about the file; 3) content of the electronic communication; 4) time of the communication; 5) a version of the file corresponding to the communication, and so forth.

The user 146 can then access the hosted file 148 on the file hosting server 102 by way of the client computing device 110, and make further edits to the hosted file 148. The feed generator component 123 identifies that a new edit has been made and updates the activity feed 152 to include a new entry, where the new entry indicates that the user 146 has edited the hosted file 148, indicates a time that the edit was made, etc.

The user 144 of the client computing device 108 may then access the hosted file 148 and make a comment to the hosted file in the hosting application 122 (rather than in the hosted file 148 itself). The feed generator component 123 can update the activity feed 152 to include still yet another entry, where this entry indicates that the user 144 has commented on the file 148, and where the entry can further include at least a portion of the comment, a time that the comment was made, and a version of the file 148 that the user 144 was reviewing when generating the comment.

The user 142 of the client computing device 106 may then access the hosted file 148 to review the hosted file 148. When the hosted file 148 is accessed, the hosting application 122 syncs with the application 130, causing the file 148 and the activity feed 152 to be transmitted from the file hosting server 102 to the client computing device 106. The application 130 loads the file 148, and causes the activity feed 152 to be presented on the display 128. As described previously, the activity feed 152 includes the above-described entries, which identify activities undertaken on the hosted file 148 by the users 142-146 across time and file version. Therefore, in the activity feed 152, the user 142 can be provided with information that indicates that the user 144 edited the hosted file 148, and thereafter that the user 146 edited the hosted file 148, and subsequently the user 144 commented on the hosted file 148, etc.

Further, as noted above, the activity feed 152 depicts activities with respect to versions of the hosted file 148. The user 142 can effectively "rewind" the hosted file 148 back to a particular version. For instance, the user 142, being the team leader, may disagree with the edit made by the user 146. The user 142 can select a previous version from the activity feed 152, can cause the file 148 to be restored to the previous version (such that it is if the edits to the file 148 were never made by the user 146), and can cause the restored version to be saved at the file hosting server 102. The feed generator component 123 can optionally update the activity feed 152 to include an entry that is representative of this activity.

Figure 2:
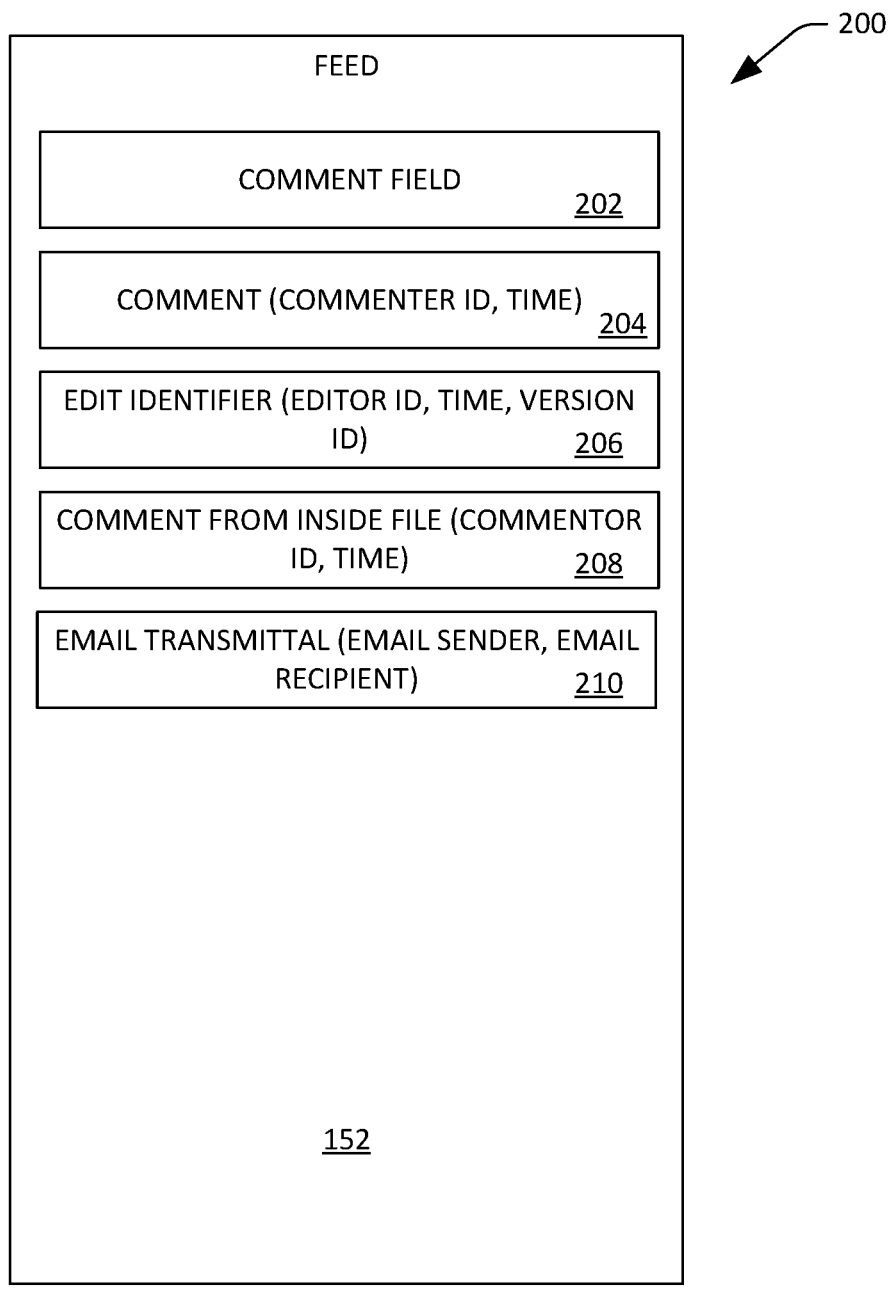
FIG. 2 is an exemplary graphical user interface of an activity feed.

Now referring to FIG. 2, an exemplary graphical user interface 200 that depicts the activity teed 152 for the file 148 is illustrated. The activity feed 152 includes a comment field 202, which is a text entry field, where a viewer of the hosted file 148 can set forth a comment about the hosted file 148. Thus, the feed generator component 123 can update the activity feed 152 with a comment entered by way of the comment field 202. The exemplary activity feed 152 includes four entries 204-210. Each entry in the entries 204-210 can include the following information: 1) an activity type that describes an activity represented by the entry; 2) an identity of a user who performed the activity; and 3) a time that the activity was performed with respect to the file 148. As shown in FIG. 2, the entry 202 is representative of a commenting activity, where a particular user has set forth a comment about the hosted file 148 by way of the hosting application 122 (e.g., by way of the comment field 202 in the activity feed 152). The entry 204 may include at least a portion of the comment, data that identifies the user who made the comment, and time that the comment was made by such user.

The second entry 206 indicates that an edit has been made to the hosted file 148. The entry 206 can include an edit identifier (indicating that the activity was of the type "edit"), contents of the edit, a location in the hosted file 148 where the edit was made, etc. Further, the entry 206 may include an identity of the editor, a time that the edit was made, and a selectable version identifier, where the version identifier indicates that such edit corresponds to an updated version of the hosted file 148. Thus, a reviewer of the activity feed 152 may then be able quickly ascertain that entries above the entry 206 in the activity feed 152 correspond to a different version of the hosted file 148 than entries below the entry 206 in the activity feed 152. Furthermore, a reviewer of the activity feed 152 can select the selectable version identifier, which can cause the file 148 to revert to the version of the file 148 identified by the version identifier.

The entry 208 indicates that a user has set forth a comment inside the file (e.g., by way of an application that is usable to edit the file). For example, the hosted file 148 may be a word processing document, and a user may have generated a comment inside the word processing document through use of a word processing application (rather than assigning the comment to the file 148 by way of the hosting application 122). To generate the entry 208, the feed generator component 123 can extract the comment from inside the hosted file 148 and include at least a portion of the comment in the entry 208 in the activity teed 152. Therefore, the entry 208 can include content of the comment, an identity of the user that made the comment, and a time that the comment was made. The hosting application 122 can be configured to communicate with the word processing application (e.g., the word processing application may expose its APIs to the hosting application 122).

The entry 210 can indicate that the hosted file 148 was transmitted by email from one user to another. The entry 210 may include content of the email, a sender of the email, a recipient of the email, a time that the email was transmitted, etc. In other examples, other types of communications may also be represented by entries in the activity feed, such as instant messages, telephone calls, or the like, wherein such communications were initiated by way of interaction with the hosted file 148 when hosted through use of the hosting application 122. Further, while not shown, the activity feed 152 can optionally include a preview of the hosted file 148, which may depict a portion of the hosted file 148.

Figure 3:
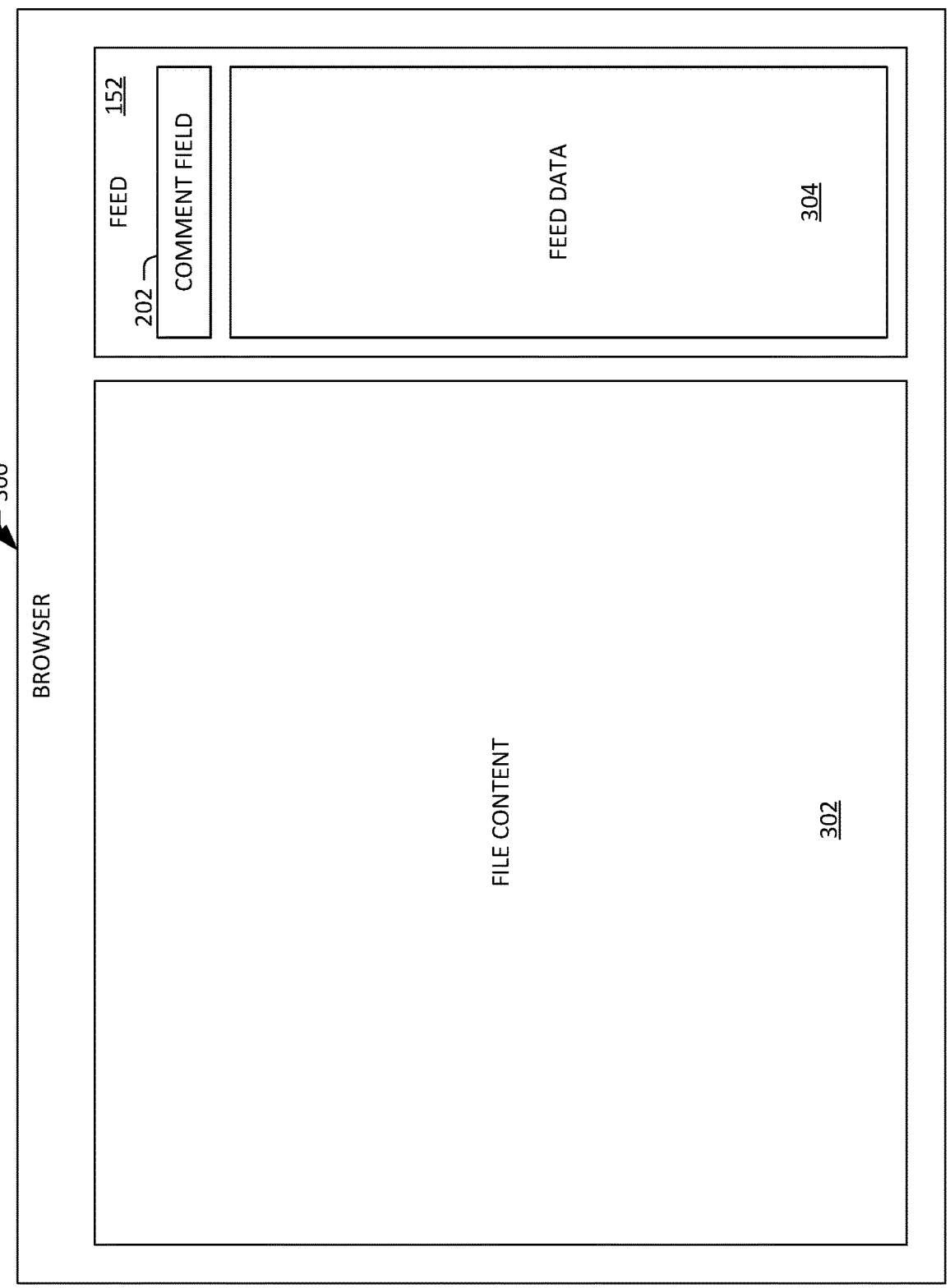
FIG. 3 is exemplary graphical user interface that includes content of a file and further includes an activity feed for the file.

Now referring to FIG. 3, an exemplary graphical user interface 300 is depicted, wherein the application 130 on the client computing device 106 is a web browser. The graphical user interface 300 includes a content field 302 that depicts content of the hosted file 148 when loaded into the application 130. When the file 148 is a word processing document, the content field 302 can include content in such word processing document. When the hosted file 148 is an image, the content field 302 can depict the image. The graphical user interface 300 may also include the activity feed 152, which comprises the comment field 202 and feed data 304. This feed data 304, in an example, can include the entries 204-210 in the activity feed 152. When the activity feed 152 includes more entries than can be shown, the activity feed 152 can include a scroll bar, such that a viewer of the activity feed 152 can scroll through entries in the activity feed 152.

Now referring to FIG. 4, another exemplary graphical user interface 400 pertaining to when the client computing device 106 is a device with a relatively large screen (e.g., when the client computing device 106 is a desktop computing, a device a laptop computing device, a tablet computing device with a relatively large screen, etc.) and the application 130 is a browser is illustrated. In the exemplary graphical user interface 400, the user 142 has directed the browser to a URL corresponding to the file hosting server 102. The hosting application 122 can transmit a list of files that are accessible to the user 142 (e.g., based upon user identity). In this example, the graphical user interface 400 includes a file list field 401 that lists files that are accessible to the user 142. Thus, the file list field 401 includes a plurality of selectable file identifiers that are representative of files hosted at the file hosting server 102. The user 142 of the client computing device 106 can utilize a cursor 402 to highlight or otherwise select a particular file identifier shown in the file list field 401 (e.g., file identifier "File 1"). The hosting application 122, in response to determining that the particular file identifier has been selected, can cause the activity feed 152 for the file represented by the file identifier to be presented at a client computing device. The exemplary graphical user interface 400 depicts that a file need not be opened to cause the activity feed 152 for the file to be presented.

Figure 5:
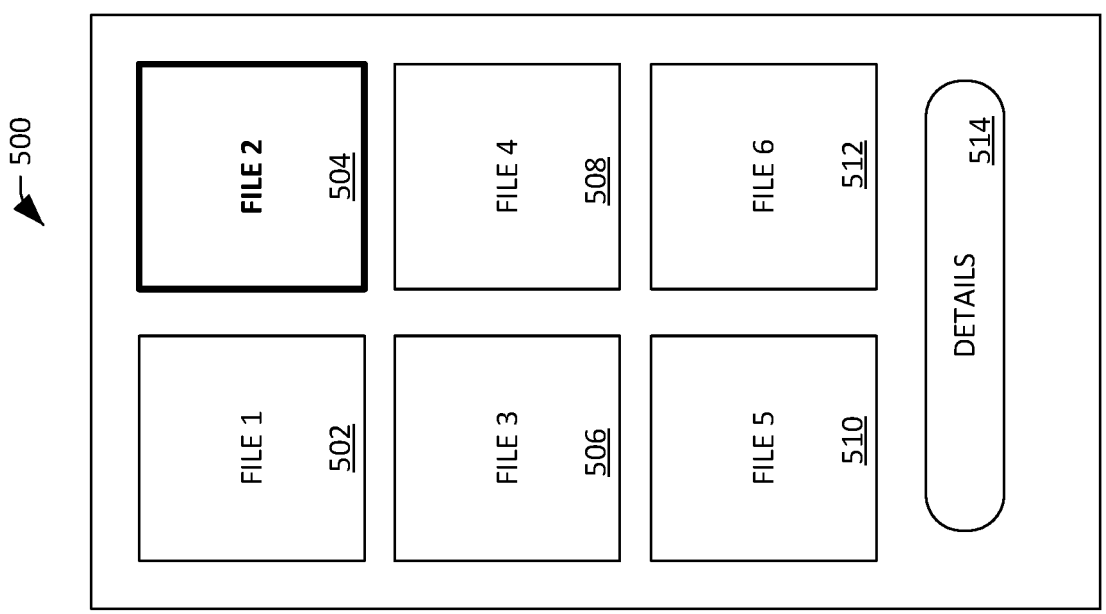
FIG. 5 is an exemplary graphical user interface that is well-suited for presentment on a mobile computing device, where the graphical user interface includes a grid arrangement of graphical icons that are representative of files.

Now referring to FIG. 5, an exemplary graphical user interface 500 that can be presented on the display 128 of the client computing device 106 when the client computing device 106 is a mobile computing device is illustrated. The graphical user interface 500 can include a plurality of icons 502-512 that are respectively representative of files hosted at the file hosting server 102 that are accessible to the user 142 of the client computing device 106 (e.g., the file hosting application determines that the user 142 is authorized to access files represented by the icons 502-512). When the user 142 selects one of the icons (e.g. icon 504), a button 514 can be presented on the graphical user interface 500, wherein selection of the button 514 causes the activity feed 152 be presented on the display 128. As the display 128 may be relatively small, the activity feed 152 may be displayed over the plurality of icons 502-512. In another example, responsive to the button 514 being selected, a portion of the activity feed 152 can be presented at the bottom portion of a display, where the activity feed 152 can be shown in a slideable window. In other words, the activity feed 152 can be expanded or collapsed to a desired size.

Figure 6:
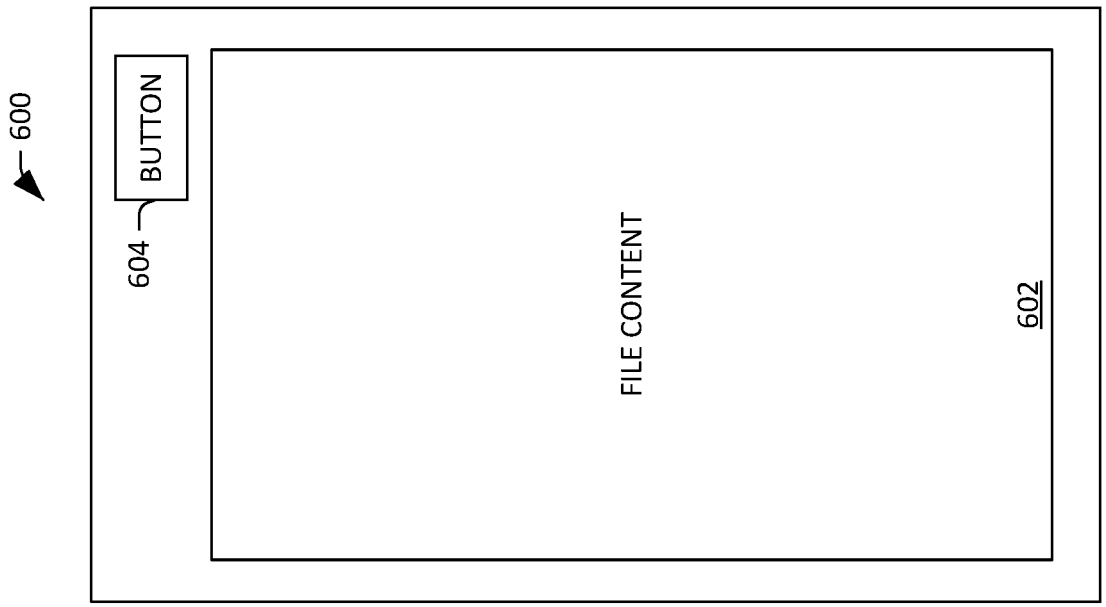
FIG. 6 is an exemplary graphical user interface that is well-suited for presentment on a mobile computing device, where the graphical user interface includes a button that, went selected, causes an activity feed to be displayed on a display of the mobile computing device.

Turning now to FIG. 6, another exemplary graphical user interface 600 that can be presented on the display 128 when the client computing device 106 is a mobile computing device is illustrated. The graphical user interface 600 includes a content field 602 that depicts content of the hosted file 148 when presented on the display 128. The graphical user interface 600 also includes a button 604 that, when selected, causes the activity feed the 152 for the hosted file 148 to be shown on the display 128 (e.g., over the content field 602). In another example, as noted above, responsive to the button 604 being selected, a portion of the activity feed 152 can overlay the file content, and the activity feed 152 can be expanded or collapsed as desired.

Figure 7:
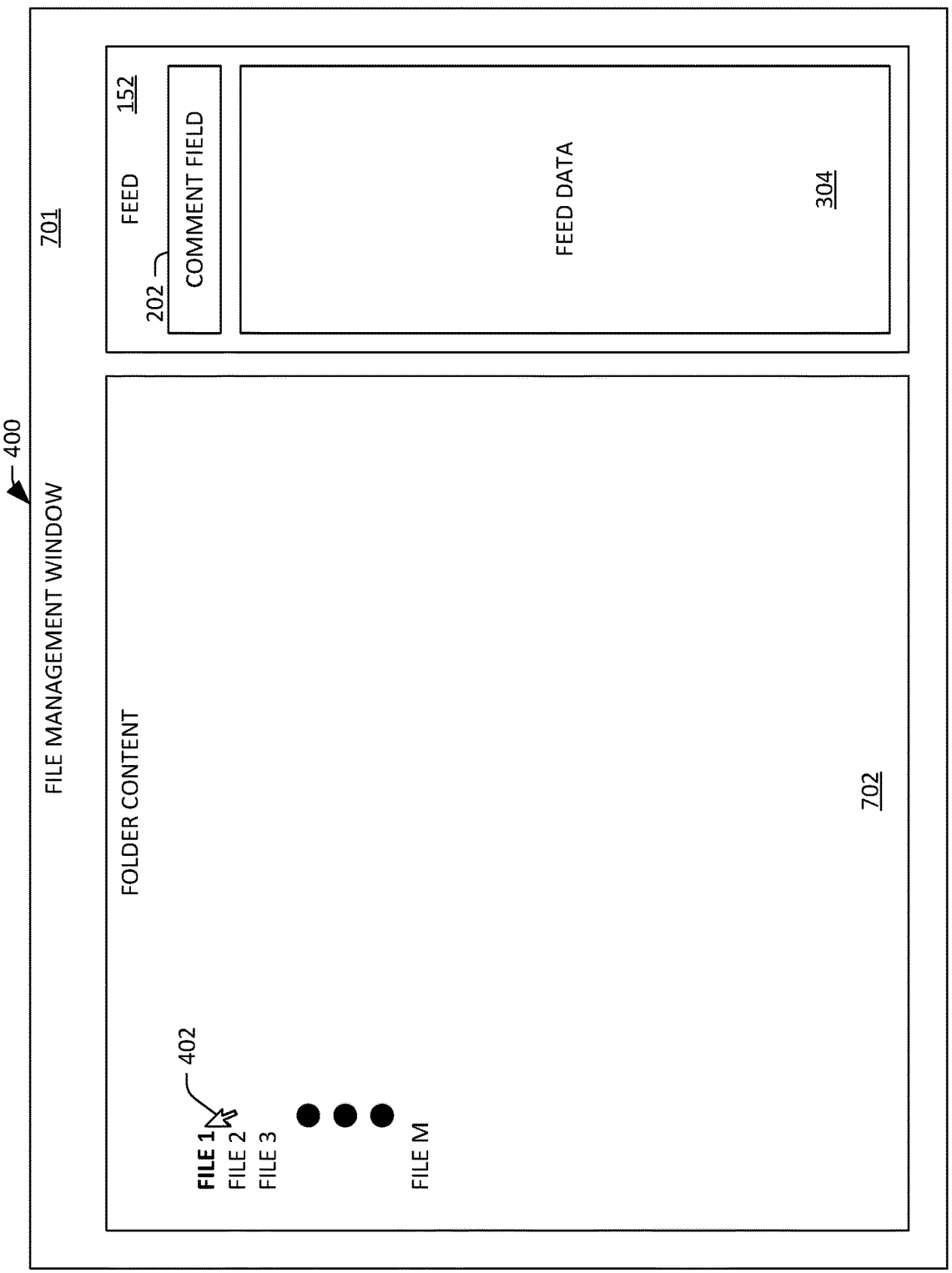
FIG. 7 is an exemplary graphical user interface that includes an activity feed that is presented upon receipt of a selection of a file from a list of files.

With reference now to FIG. 7, yet another graphical user interface 700 that can be presented on the display 128 of the client computing device 106 when the display 128 is a relatively large display is illustrated. In this example, the hosting application 122 is accessed from the client computing device 106 by way of a file management window 701 (e.g., rather than a browser). The file management window 701 can include a field 702 that depicts content of a folder selected by the user 142 of the client computing device 106, where this folder is synced with the file hosting application 122. When the cursor 402 is used to select a file identifier that represents hosted file in the field 702, the activity teed 152 for the hosted file is presented in the file management window 701. Again, in this example, the user 142 need not open the hosted file to obtain the activity feed 152 of the file.

Figure 8:
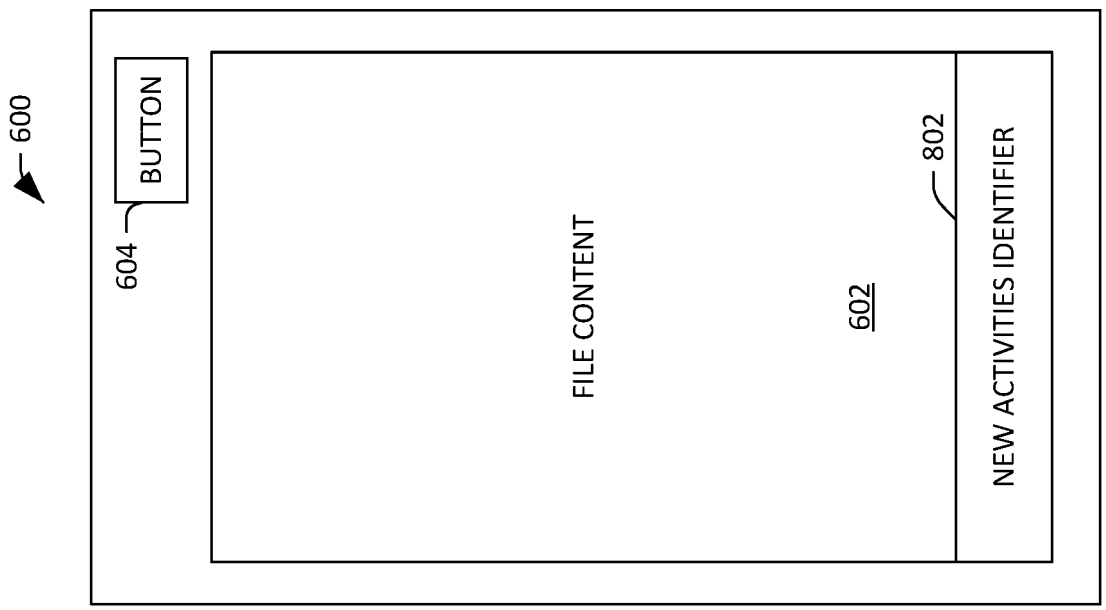
FIG. 8 is an exemplary graphical user interface that is well-suited for presentment on a mobile computing device, wherein the graphical user interface includes a banner that indicates that activities have been performed relative to a file, and further indicates that a viewer of the file has not previously reviewed an entry in an activity feed that represents an activity undertaken with respect to the file.

Now referring to FIG. 8, another exemplary graphical user interface 800 that can be presented on the display 128 when the client computing device 106 is a mobile computing device is illustrated. The graphical user interface 800 is similar to the graphical user interface 600 shown in FIG. 6. In the exemplary graphical user interface 800, however, a new activities identifier 802 is included that indicates to the user 142 that, since the user 142 has last reviewed the hosted file 148, the activity feed 152 has been updated to include entries that have not previously been displayed to the user 142. This new activities identifier 802 may be a badge that indicates number of entries in the activity feed 152 that have not previously been presented to the user 142. In another example, the new activities identifier 802 can include snippets from "new" entries. When the button 604 is selected, at least a portion of the activity feed 152 is presented on the display 128.

Figure 9:
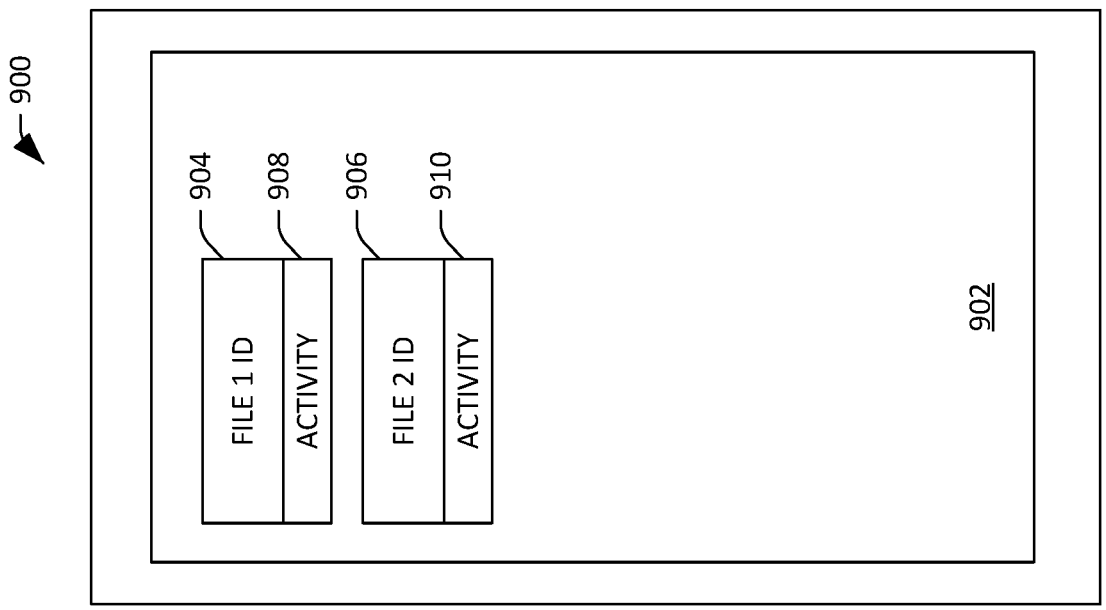
FIG. 9 is an exemplary graphical user interface that is well-suited for presentment on a mobile computing device, wherein the graphical user interface depicts a list of file identifiers, and wherein activity identifiers can be presented in connection with the file identifiers.

Referring now to FIG. 9, another exemplary graphical user interface 900 that can be presented on the display 128 when the client computing device 106 is a mobile computing device is illustrated. The graphical user interface 900 includes a field 902 that comprises a list of file identifiers 904 and 906 that respectively represent files hosted at the file hosting server 102 (where such files are accessible to the user 142). Additionally, the identifiers 904 and 906 can have graphical data associated therewith that indicates that activity feeds for the files represented by the identifiers have "new" entries. For example, the graphical user interface 900 can include an activity badge 908 corresponding to the file identifier 904, and can also include an activity badge 910 corresponding to the file identifier 906. In an example, the activity badge 908 can indicate that the activity feed for the file represented by the file identifier 904 has at least one new entry therein. Further, the activity badge 908 can identify a number of new entries in the activity feed.

With reference now to FIG. 10, an exemplary graphical user interface 1000 corresponding to an email application is illustrated, where the graphical user interface 1000 is configured for presentment of a display of a mobile computing device. The graphical user interface 1000 includes a plurality of email snippets 1002-1006 corresponding to emails received by way of the communications application 136.

The first email snippet 1002 includes message information 1008, which can include an identity of a sender, a subject of the email, a portion of a body of the email, etc. The first email snippet 1002 includes a file identifier 1010 for the hosted file 148, indicating that an email includes the hosted file 148 as an attachment or makes reference to the hosted file 148. The file identifier 1010 can include a badge (not shown) that indicates that the activity feed 152 for the file 148 includes some number of "new" entries (e.g., entries not before seen by the recipient of the email). For instance, the badge can indicate that the activity feed 152 for the file 148 includes four new entries. The first email snippet 1002 also includes, for instance, a most recent entry 1012 in the activity feed 152 for the file 148, where the most recent entry 1012 is shown in graphical relation (e.g., adjacent to) to the file identifier 1010.

Now referring to FIG. 11, another exemplary graphical user interface 1100 corresponding to the activity feed 152 is illustrated. As indicated previously, each entry in the activity feed 152 can include the following information: 1) an identity of a user who performed an activity with respect to the file; 2) a type of the activity (created, renamed, deleted, edited, commented upon, emailed etc.); 3) a time when the activity took place; and 4), optionally, a version of the hosted file 148 corresponding to the activity. Entries can be filtered and aggregated based upon any of such data. As shown in FIG. 11, the graphical user interface 1100 depicts a visual aggregation of entries filtered by the activity type "edited". In other words, the user 142 can indicate that she wishes to be provided with an aggregated view of entries corresponding to the activity "edited" with respect to the hosted file 148. The aggregated view in FIG. 11 indicates that four users have edited the file 148.

Referring to FIG. 12, an exemplary graphical user interface 1200 that depicts an expanded view of entries filtered by activity type is illustrated. Here, the user 142 has indicated a desire to be provided with entries that are representative of the activity "edited". In response to receipt of such indication, the user 142 can be provided with a series of (time ordered) entries having the "edited" type. Thus, in the graphical user interface 1200, the user 142 can perceive that a first user recently edited the hosted file 148, that 5 minutes ago a second user edited the hosted file 148, and so forth.

Figure 13:
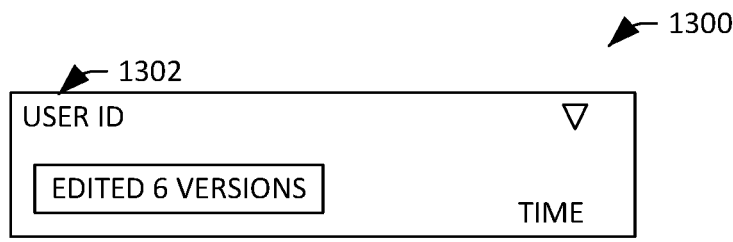
FIG. 13 is an exemplary graphical user interface that depicts at least a portion of an activity feed, where activities are aggregated in the activity feed based upon a selected user identity who performed activities with respect to a hosted file.
Figure 14:
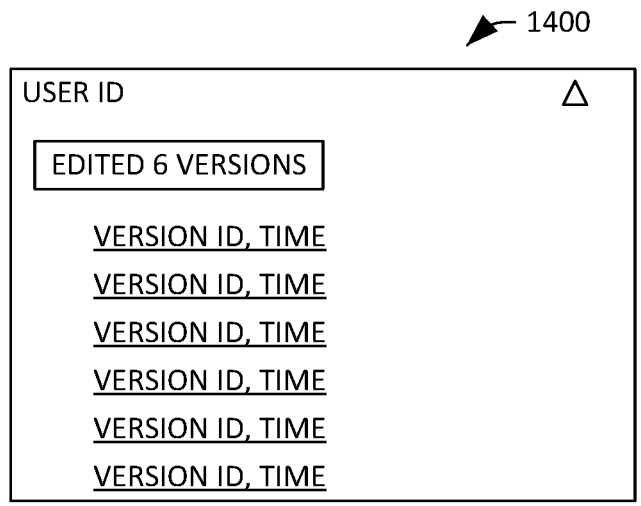
FIG. 14 is an exemplary graphical user interface that depicts at least a portion of an activity feed, where the activity feed is expanded to depict individual entries that are representative of activities performed by a specified user.

With reference now to FIG. 13, another exemplary graphical user interface 1300 is illustrated, where the graphical user interface 1300 depicts an aggregated view of entries filtered by user and activity type. The aggregated view indicates to the user 142 that the user identified by a user identifier 1302 has edited the hosted file 148 six times (in some specified time window). FIG. 14 depicts a graphical user interface 1400 that illustrates an expanded view, where individual edits are represented with their corresponding file versions. The user 142 can cause the hosted file 148 to be restored to any the versions by selecting a version in the graphical user interface 1400.

While the examples set forth above have been set forth in correlation with the hosted file 148, it is to be understood that entries can be filtered on files, file folders, and/or users. For instance, it may be desirable to understand activities undertaken by a certain user with respect to a plurality of files; accordingly, an activity feed that is representative of activities undertaken by the user with respect to such files can be generated based upon tracking of activities of the user over time with respect to entities hosted at the file hosting server 102. Likewise, an activity feed for a file folder can include entries representative of activities undertaken with respect to files located in the file folder.

Figure 15:
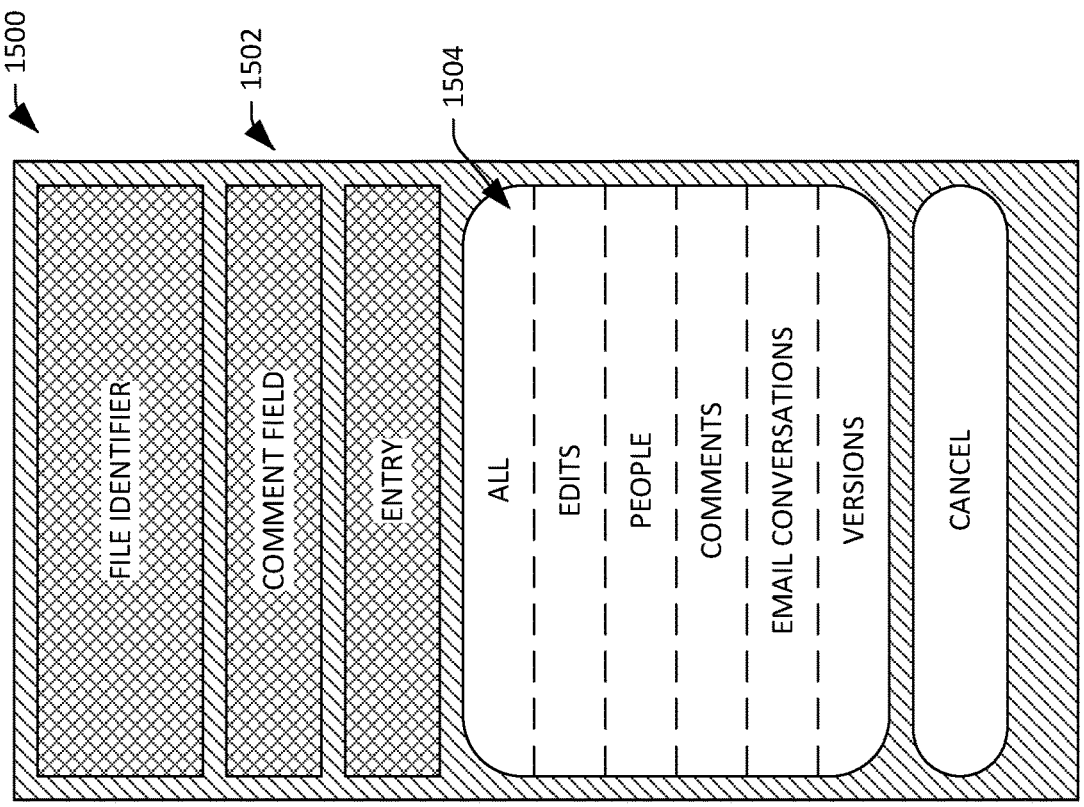
FIG. 15 is an exemplary graphical user interface that includes selectable buttons that facilitate filtering of activities represented in an activity feed of a hosted file.

Now referring to FIG. 15, an exemplary graphical user interface 1500 is illustrated, wherein the graphical user interface 1500 is suitable for display on the display 128 of the client computing device 106 when the client computing device 106 is a mobile computing device. The graphical user interface 1500 includes an exemplary activity feed 1502 (where the activity feed 1502 is shaded to indicate that the activity feed 1502 is not at the forefront of interface elements shown on a display). In response to selecting a button, a plurality of filter options 1504 can be presented with respect to the activity feed. In the example shown in FIG. 15, activities in the activity feed can be filtered by the type "edit", by users ("people") who perform the activities represented in the activity feed 1502, by the type "comments", by the type "mail conversations", or by "version". Selecting one of the buttons shown in the buttons 1504 may cause the user 142 to be presented with additional filtering options, such as listing individual people who have performed activities with respect to the hosted file 148. Selection of one of the people listed results in the activities filtered by the selected person. Further, while not shown, it can be ascertained that a search field can be presented, and the activity feed can be filtered based upon text set forth in the search field.

Figure 16:
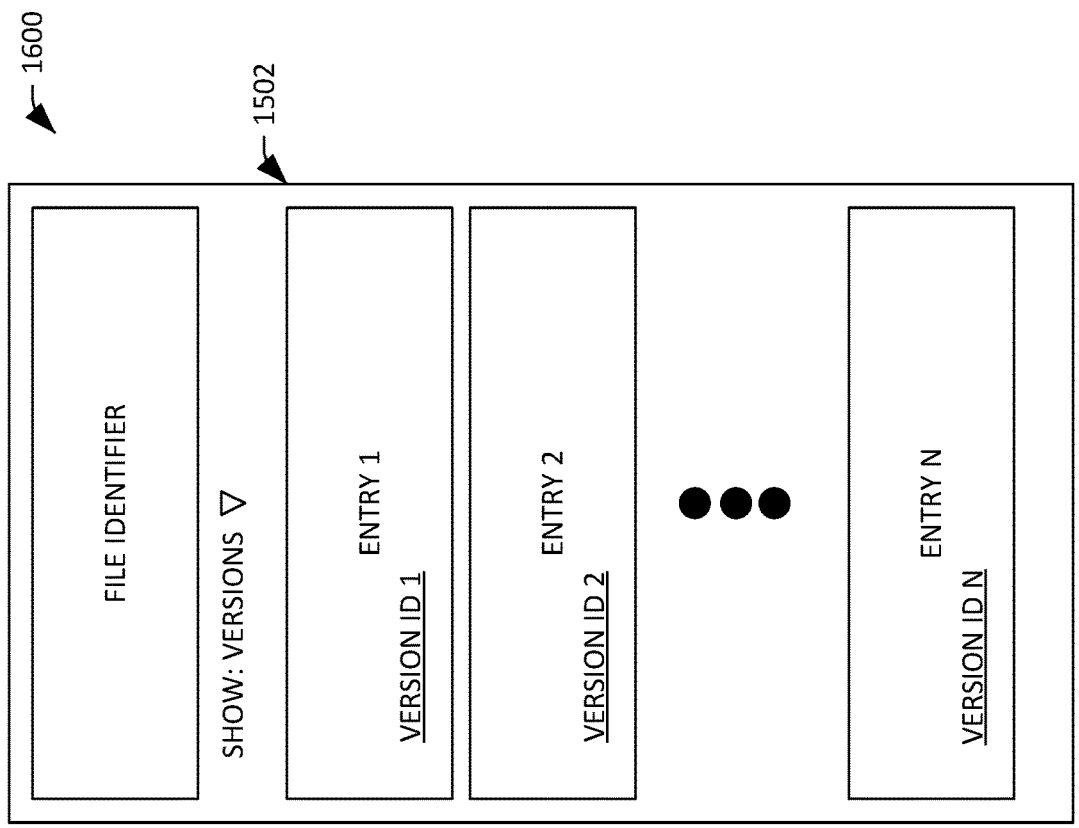
FIG. 16 is an exemplary graphical user interface that is well-suited for presentment on a mobile computing device, where entries in an activity feed of a file include version identifiers that identify versions of the file upon which activities were performed.

Turning to FIG. 16, an exemplary graphical user interface 1600 is illustrated. When the user has selected the "versions" button from the buttons 1504 of the graphical user interface 1500, the activity feed 1502 is filtered to depict entries corresponding to different versions of the hosted file 148.

Figure 17:
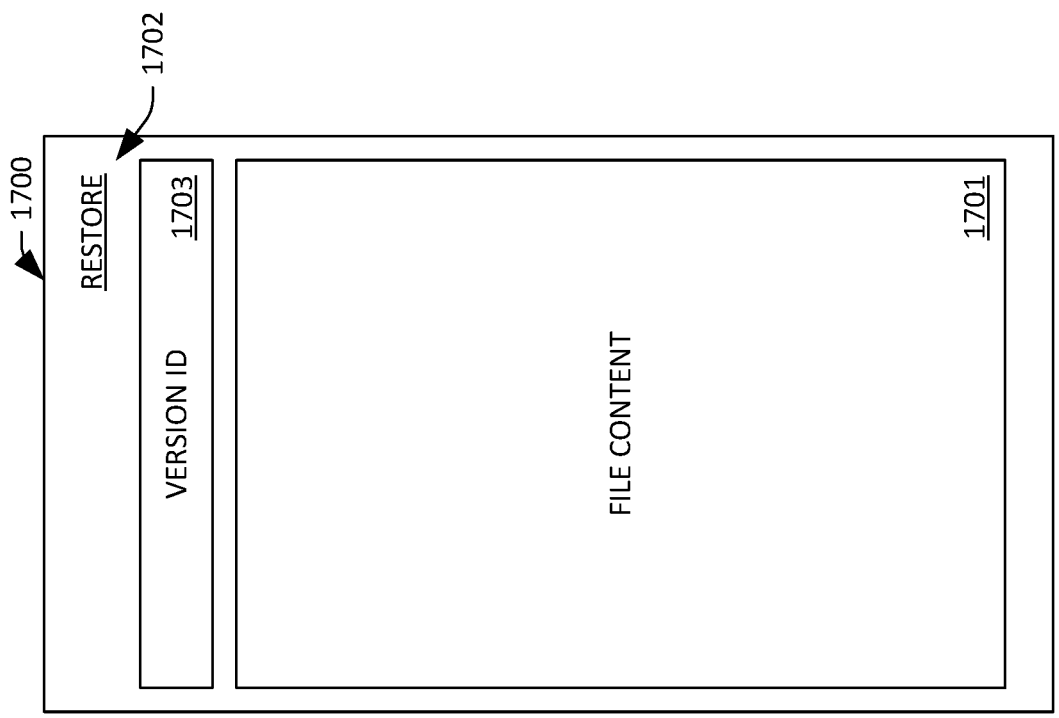
FIG. 17 is an exemplary graphical user interface that depicts file content.

With reference now to FIG. 17, an exemplary graphical user interface 1700 is depicted, where the user 142 can restore a file from a selected version. As shown in FIG. 16, the graphical user interface 1600 can include selectable links to versions of the hosted file 148. Responsive to the user selecting one of such links, the version of the hosted file 148 corresponding to the selected link can be presented on the display 128 of the client computing device 106, such that file content 1701 for the selected version (represented by a version identifier 1703) is presented. The graphical user interface 1700 can include a button 1702 that, went selected by the user 142, causes the selected version to be restored (e.g., the hosted file 148 can be "rewound" to the selected version).

Figure 18:
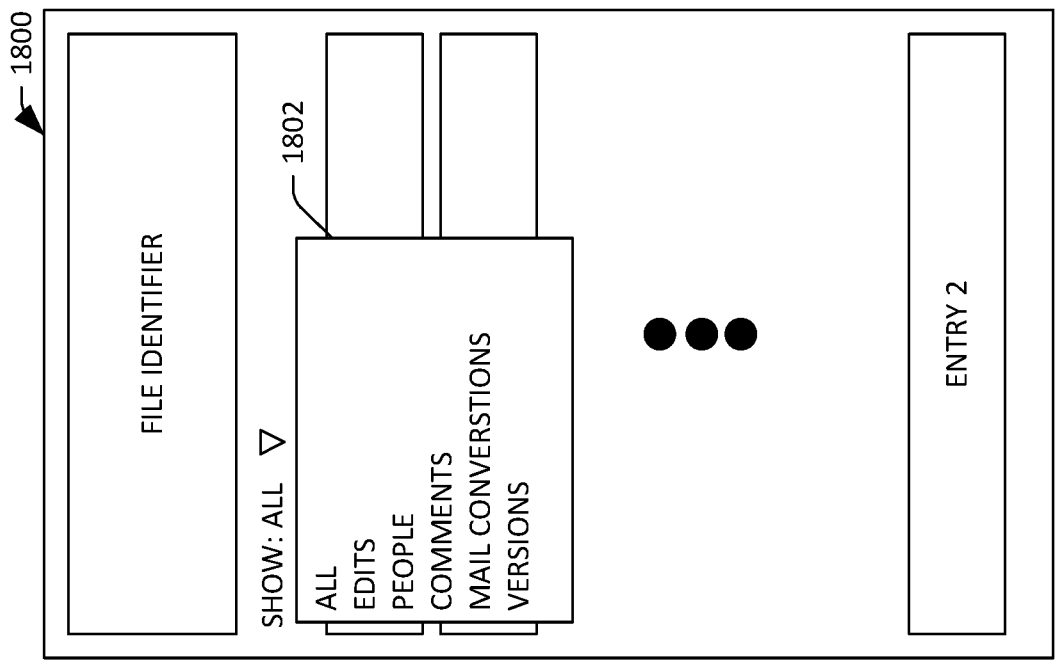
FIG. 18 is an exemplary graphical user interface that facilitates filtering entries in an activity feed for a hosted file.

Now referring to FIG. 18, another exemplary graphical user interface 1800 is depicted, wherein the graphical user interface 1800 includes a pulldown 1802 that can be used to filter activities in the activity feed 152. In an example, the graphical user interface 1800 may be well-suited for presentment on the display 128 of the client computing device 106 when the display 120 is a relatively large display.

Figure 19:
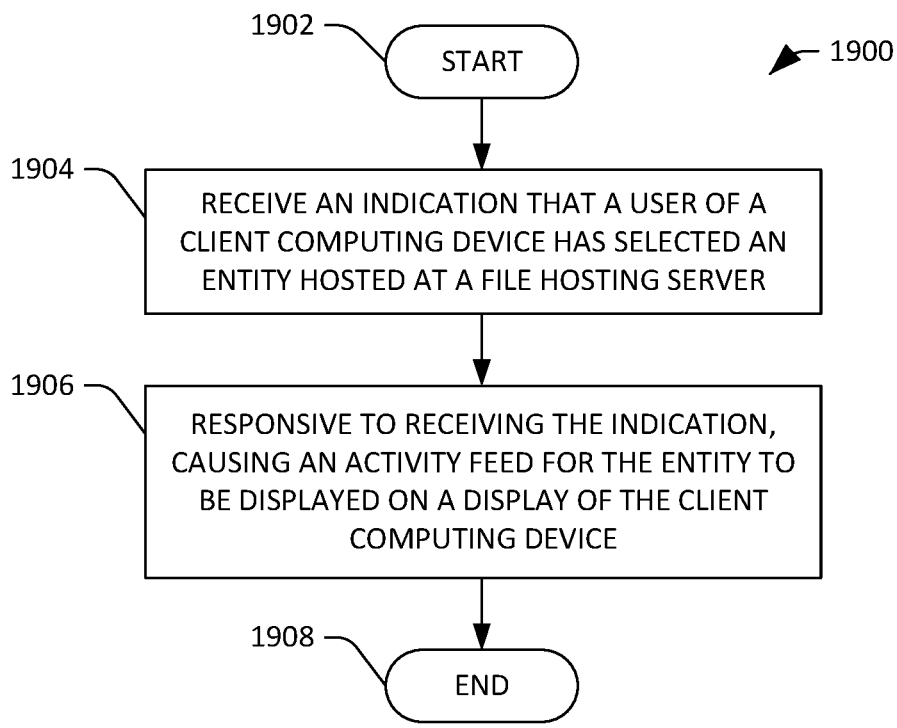
FIG. 19 is a flow diagram that illustrates an exemplary methodology for displaying an activity teed for a file hosted at a file hosting server.
Figure 20:
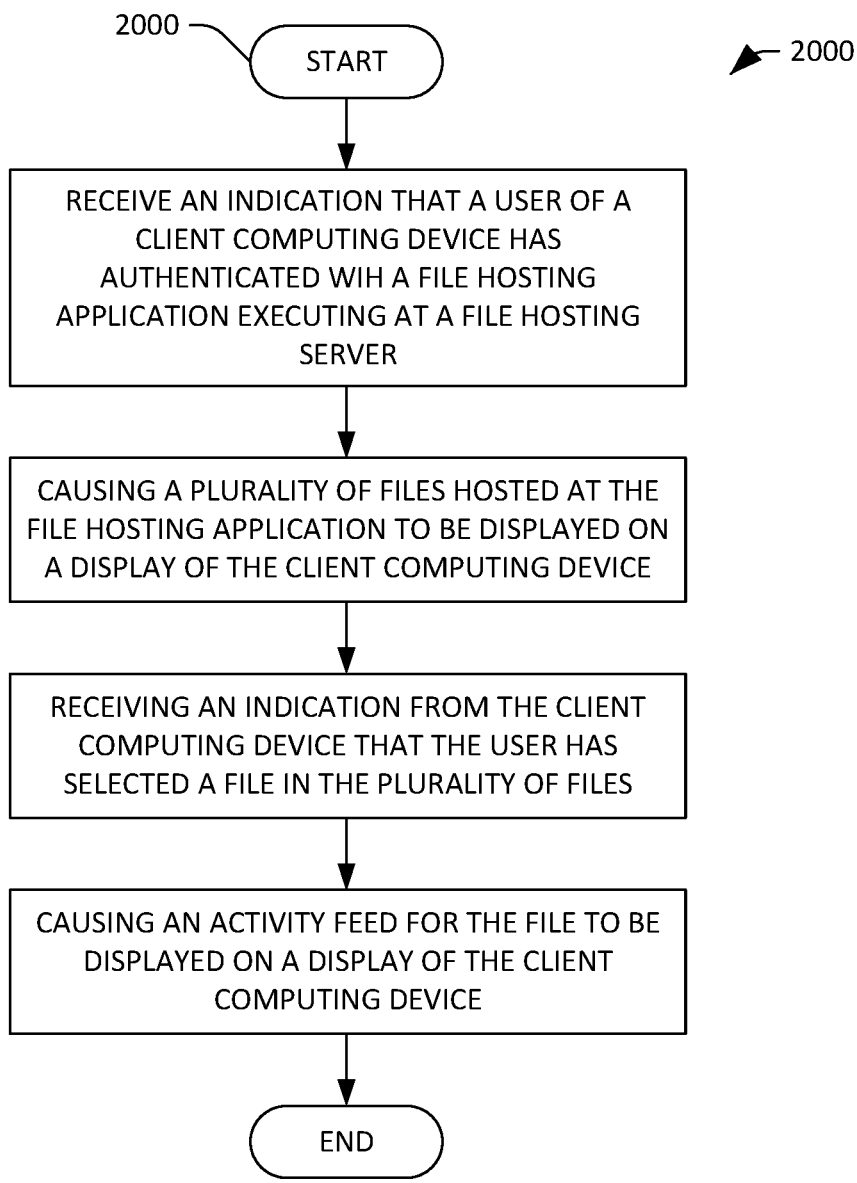
FIG. 20 is a flow diagram that illustrates an exemplary methodology for displaying an activity feed for a file hosted at a file hosting server.

FIGS. 19-20 illustrate exemplary methodologies relating to causing an activity feed for an entity hosted at a file hosting server to be presented on a client computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 19, an exemplary methodology 1900 for causing an activity feed for an entity hosted at a file hosting server is illustrated. The methodology 1900 starts at 1902, and at 1904, at a file hosting server that executes a file hosting application, an indication is received that a user of a client computing device has selected an entity hosted at the file hosting server. This indication can be a selection by way of a human-machine interface, such as a touch screen, a mouse, a keyboard, a microphone, etc. The entity can be a file, a file folder, a user identity, etc., where the entity is accessible to the client computing device by way of the file hosting application. As described previously, the file hosting application is configured to provide a collaborative environment where users (e.g., in an enterprise) can collaboratively work on a file, a set of files in a file folder, etc. For instance, the file hosting application can provide simultaneous access to files to multiple client computing devices (which are operated by multiple users who have authenticated with the file hosting application).

At 1906, responsive to receiving the indication, an activity feed for the entity can be caused to be displayed on a display of the client computing device. The activity feed includes a plurality of entries that are representative of a plurality of activities undertaken with respect to the entity over time. Entries in the plurality of entries are arranged in a sequence that corresponds to a sequence in which the activities were undertaken with respect to the entity. Thus, for instance, most recent activities can be represented by entries at a top of the activity feed, while less recent activities can be represented by entries at a bottom of the activity feed. The methodology 1900 completes at 1908.

Turning now to FIG. 20, an exemplary methodology 2000 for causing an activity feed for a file hosted at a file hosting server is illustrated. The methodology 2000 starts at 2002, and at 2004, an indication is received that a user of a client computing device has authenticated with a file hosting application executing at a file hosting server. As noted previously, the file hosting application provided an environment that is well-suited for collaboration with respect to a file. For instance, the file hosting application can be configured to simultaneously provide access to a file hosted at the file hosting server to users who are authorized to access the file, where multiple users can simultaneously work on the file.

At 2006, in response to receiving the indication that the user of the client computing device has authenticated with the file hosting application, a plurality of file identifiers are caused to be displayed on a display of the client computing device, where the file identifiers are representative of files hosted at the file hosting server. At 2008, an indication is received from the client computing device that the user has selected a file identifier in the plurality of file identifiers. At 2010, in response to receiving the indication from the client computing device that the user has selected the file identifier, an activity feed for a file represented by the file identifier is callused to be displayed on the display of the client computing device. The activity feed includes a plurality of entries that are representative of a plurality of activities undertaken with respect to the file over time, where the plurality of entries are arranged in accordance with a chronology in which the activities were undertaken with respect to the file over time. The methodology 2000 completes at 2012.

Various examples are now set forth.

Example 1

A computing system comprising: at least one processor; and memory that has a file hosting application loaded therein, wherein the at least one processor, when executing the file hosting application, is configured to perform acts comprising: receiving, from a client computing device that is in network communication with a file hosting server, an indication that an entity hosted by the file hosting server has been selected by a user of the client computing device who has authenticated with the file hosting application, wherein the entity is simultaneously accessible to multiple client computing devices by way of the file hosting application; and responsive to receiving the indication, causing an activity feed for the entity to be displayed on a display of the client computing device, the activity feed comprises a plurality of chronologically-ordered entries that are representative of a plurality of activities undertaken with respect to multiple versions of the entity over time.

Example 2

The computing system according to Example 1, wherein the entity is a folder, and further wherein the plurality of activities are activities undertaken on files in the folder.

Example 3

The computing system according to Example 1, wherein the entity is a file, and further wherein the plurality of activities are activities undertaken on the file.

Example 4

The computing system according to Example 3, wherein the plurality of entries include an entry that indicates that a user who is authorized to access the file has caused the file to be shared, by way of the file hosting application, with at least one other user who previously was not authorized by the file hosting application to access the file.

Example 5

The computing system according to any of Examples 1-4, wherein the activity feed comprises a text entry field, the acts further comprising: updating the activity feed to include an entry that is representative of a comment about the entity in response to the comment being submitted by way of the text entry field.

Example 6

The computing system according to Example 1, wherein the entity is a file that is editable by way of a computer-executable application, the acts further comprising: updating the activity feed to include an entry that is representative of a comment about the entity in response to the comment being submitted in the computer-executable application.

Example 7

The computing system according to Example 6, wherein the computer-executable application is one of a word processing application, a spreadsheet application, or a slide presentation application.

Example 8

The computing system according to Example 6, wherein the entity is a file, and further wherein the plurality of entries include an entry that indicates that the file has been referenced in an electronic communication, wherein the electronic communication was initiated from a client computing device operated by a user who is authorized by the file hosting application to access the file.

Example 9

The computing system according to Example 1, wherein the entity is a file, and further wherein the plurality of entries comprise an entry that includes a selectable link that is representative of a previous version of the file, the acts further comprising: displaying the previous version of the file on the display of the client computing device responsive to receiving an indication that the selectable link has been selected.

Example 10

The computing system according to Example 1, wherein each entry in the plurality of entries comprises data that identifies a respective user who performed an activity represented by the entity, and further wherein the activity was performed with respect to the entity.

Example 11

The computing system according to Example 1, the acts further comprising: causing a plurality of selectable entities hosted by the file hosting application to be presented on the display of the client computing device, the entity is included in the plurality of selectable entities, and wherein the indication that the entity hosted by the file hosting application has been selected is an indication that the user has selected the entity without causing the entity to be opened in the file hosting application.

Example 12

A method comprising: at a file hosting server that executes a file hosting application, receiving an indication that a user of a client computing device has selected an entity hosted at the file hosting server, the entity accessible to the client computing device by way of the file hosting application, the file hosting application provides simultaneous access to the entity to multiple client computing devices operated by multiple users who are authorized by the file hosting application to access the entity; and responsive to receiving the indication, causing an activity feed for the entity to be displayed on a display of the client computing device, the activity feed comprises a plurality of entries that are representative of a plurality of activities undertaken with respect to the entity over time, entries in the plurality of entries are arranged in a sequence that corresponds to a sequence in which the activities were undertaken with respect to the entity.

Example 13

The method according to Example 12, wherein each entry in the plurality of entries comprises: data that identifies a type of activity represented by the entry; an identity of a user who performed the activity represented by the entry; and data that identifies a time that the activity was performed with respect to the entity.

Example 14

The method according to Example 13, further comprising: receiving a request to filter entries in the activity feed based upon an identity of a user who performed at least one activity represented by at least on entry in the plurality of entries; and in response to receiving the request, filtering the entries in the activity feed such that the activity feed includes only entries that are representative of activities performed by the identified user.

Example 15

The method according to Example 13, further comprising: receiving a request to filter entries in the activity teed based upon the type of activity; and in response to receiving the request, filtering the entries in the activity feed such that the activity feed includes only entries that are representative of activities of the type of activity.

Example 16

The method according to any of Examples 12-15, wherein an entry in the plurality of entries comprises a selectable version identifier that is representative of a previous version of the entity, the acts further comprising: responsive to receiving that the selectable version identifier has been selected by the user of the client computing device, causing the previous version of the entity to be displayed on the display of the client computing device.

Example 17

The method according to any of Examples 12-16, wherein the entity is a file, the acts further comprising: receiving an indication that the user of the client computing device has set forth a comment about a portion of the file, the comment set forth in a computer-executable application executing on the client computing device that is usable to edit the file; and updating the activity feed to include an entry that is representative of the comment being set forth about the portion of the file.

Example 18

The method according to Example 17, wherein the entry comprises: the comment; and the portion of the file.

Example 19

The method according to any of Examples 12-18, wherein the activity feed comprises a text entry field that is configured to receive comments about the entity, the method further comprising: receiving a comment set forth about the entity in the text entry field of the activity teed; and updating the activity feed to include an entry that includes the comment.

Example 20

A computer-readable storage medium comprising instructions that, when executed by a processor, cause the processor to perform acts comprising: receiving an indication that a user of a client computing device has authenticated with a file hosting application executing at a file hosting server, the file hosting application is configured to simultaneously provide access to a file hosted at the file hosting server to users who are authorized to access the file; in response to receiving the indication that the user of the client computing device has authenticated with the file hosting application, causing a plurality of file identifiers to be displayed on a display of the client computing device, the plurality of file identifiers representative of a plurality of files hosted at the file hosting server; receiving an indication from the client computing device that the user has selected a file identifier in the plurality of file identifiers; and in response to receiving the indication from the client computing device that the user has selected the file identifier in the plurality of file identifiers, causing an activity feed for a file represented by the file identifier to be displayed on the display of the client computing device, the activity feed comprises a plurality of entries that are representative of a plurality of activities undertaken with respect to the file over time, the plurality of entries arranged in accordance with a chronology in which the activities were undertaken with respect to the file over time.

Example 21

A system comprising: at a file hosting server that executes a file hosting application, means for receiving an indication that a user of a client computing device has selected an entity hosted at the file hosting server, the entity accessible to the client computing device by way of the file hosting application, the file hosting application provides simultaneous access to the entity to multiple client computing devices operated by multiple users who are authorized by the file hosting application to access the entity; and means for causing an activity feed for the entity to be displayed on a display of the client computing device, the activity feed comprises a plurality of entries that are representative of a plurality of activities undertaken with respect to the entity over time, entries in the plurality of entries are arranged in a sequence that corresponds to a sequence in which the activities were undertaken with respect to the entity.

Figure 21:
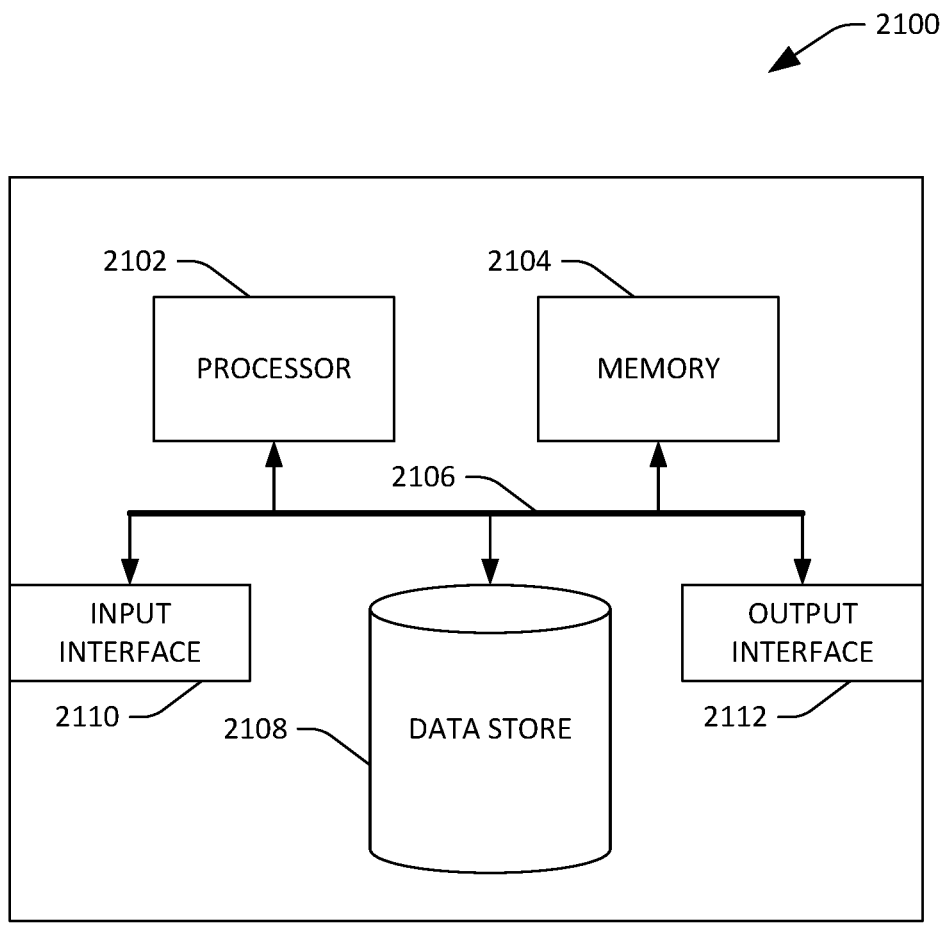
FIG. 21 is an exemplary computing system.

Referring now to FIG. 21, a high-level illustration of an exemplary computing device 2100 that can be used in accordance with the systems and methodologies disclosed herein is illustrated. For instance, the computing device 2100 may be used in a system that supports hosting files: By way of another example, the computing device 2100 can be used in a system that supports accessing hosted files. The computing device 2100 includes at least one processor 2102 that executes instructions that are stored in a memory 2104. The instructions may be, for instance, instructions for implementing functionality described as being carried out by one or more components discussed above or instructions for implementing one or more of the methods described above. The processor 2102 may access the memory 2104 by way of a system bus 2106. In addition to storing executable instructions, the memory 2104 may also store hosted files, activity feeds, etc.

The computing device 2100 additionally includes a data store 2108 that is accessible by the processor 2102 by way of the system bus 2106. The data store 2108 may include executable instructions, hosted files, an organizational graph, activity feeds, etc. The computing device 2100 also includes an input interface 2110 that allows external devices to communicate with the computing device 2100. For instance, the input interface 2110 may be used to receive instructions from an external computer device, from a user, etc. The computing device 2100 also includes an output interface 2112 that interfaces the computing device 2100 with one or more external devices. For example, the computing device 2100 may display text, images, etc. by way of the output interface 2112.

It is contemplated that the external devices that communicate with the computing device 2100 via the input interface 2110 and the output interface 2112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2100 may be a distributed system. Thus, for instance, several devices may be in communication by way of a network connection and may collectively perform tasks described as being performed by the computing device 2100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
at least one processor; and
memory that has a file hosting application loaded therein, wherein the at least one processor, when executing the file hosting application, is configured to perform acts comprising:
  causing content of a folder hosted by the file hosting application to be displayed on a display of a client computing device that is in network communication with the computing system, the content of the folder includes a plurality of identifiers for entities included in the folder;
  receiving, from the client computing device, an indication that an identifier from amongst the plurality of identifiers has been selected by a user of the client computing device who has authenticated with the file hosting application, wherein the identifier represents an entity included in the folder, wherein the entity is simultaneously accessible to multiple client computing devices by way of the file hosting application;
  responsive to receiving the indication, causing an activity feed for the entity to be displayed on the display of the client computing device, wherein the activity feed is displayed on the display together with the content of the folder, the activity feed comprises a plurality of chronologically-ordered entries that are representative of a plurality of activities undertaken with respect to multiple versions of the entity over time, wherein each entry in the plurality of chronologically-ordered entries comprises:
    data that identifies a type of activity represented by the entry;
    an identity of a user who performed the activity represented by the entry; and
    data that identifies a time that the activity was performed with respect to the entity;
  receiving a request to filter entries in the activity feed based upon the type of activity; and
    in response to receiving the request, filtering entries in the activity feed such that the activity feed includes only entries that are representative of activities of the type of activity.

2. The computing system of claim 1, wherein the entity is a second folder, and further wherein the plurality of activities are activities undertaken on files in the second folder.

3. The computing system of claim 1, wherein the entity is a file, and further wherein the plurality of activities are activities undertaken on the file.

4. The computing system of claim 3, wherein the plurality of entries include an entry that indicates that a user who is authorized to access the file has caused the file to be shared, by way of the file hosting application, with at least one other user who previously was not authorized by the file hosting application to access the file.

5. The computing system of claim 1, wherein the activity feed comprises a text entry field, the acts further comprising:
  updating the activity feed to include an entry that is representative of a comment about the entity in response to the comment being submitted by way of the text entry field.

6. The computing system of claim 1, wherein the entity is a file that is editable by way of a computer-executable application, the acts further comprising:
  updating the activity feed to include an entry that is representative of a comment about the entity in response to the comment being submitted in the computer-executable application.

7. The computing system of claim 6, wherein the computer-executable application is one of a word processing application, a spreadsheet application, or a slide presentation application.

8. The computing system of claim 6, wherein the entity is a file, and further wherein the plurality of entries include an entry that indicates that the file has been referenced in an electronic communication, wherein the electronic communication was initiated from a second client computing device operated by a second user who is authorized by the file hosting application to access the file.

9. The computing system of claim 1, wherein the entity is a file, and further wherein the plurality of entries comprise an entry that includes a selectable link that is representative of a previous version of the file, the acts further comprising:
  displaying the previous version of the file on the display of the client computing device responsive to receiving an indication that the selectable link has been selected.

10. A method comprising:
  at a file hosting server that executes a file hosting application, and in response to receipt of a request to display content of a folder hosted by the file hosting application from a client computing device, causing identifiers for entities to be displayed on a display of the client computing device, wherein the folder includes the entities;
  at the file hosting server, receiving an indication that a user of the client computing device has selected an identifier from the identifiers, wherein the identifier represents an entity in the entities, the entity accessible to the client computing device by way of the file hosting application, the file hosting application provides simultaneous access to the entity to multiple client computing devices operated by multiple users who are authorized by the file hosting application to access the entity;
  responsive to receiving the indication, causing an activity feed for the entity to be displayed on the display of the client computing device, wherein the activity feed is displayed concurrently with the identifiers, and further wherein the activity feed comprises a plurality of entries that are representative of a plurality of activities undertaken with respect to the entity over time, entries in the plurality of entries are arranged in a sequence that corresponds to a sequence in which the activities were undertaken with respect to the entity, wherein each entry in the plurality of entries comprises:
  data that identifies a type of activity represented by the entry;
  an identity of a user who performed the activity represented by the entry; and
  data that identifies a time that the activity was performed with respect to the entity;
receiving a request to filter entries in the activity feed based upon the type of activity; and
in response to receiving the request, filtering the entries in the activity feed such that the activity feed includes only entries that are representative of activities of the type of activity.

11. The method of claim 10, further comprising:
receiving a request to filter entries in the activity feed based upon an identity of a second user who performed an activity represented by an entry in the plurality of entries; and
in response to receiving the request, filtering the entries in the activity feed such that the activity feed includes only entries that are representative of activities performed by the second user.

12. The method of claim 10, wherein an entry in the plurality of entries comprises a selectable version identifier that is representative of a previous version of the entity, the acts further comprising:
responsive to receiving an indication that the selectable version identifier has been selected by the user of the client computing device, causing the previous version of the entity to be displayed on the display of the client computing device.

13. The method of claim 10, wherein the entity is a file, the acts further comprising:
receiving an indication that the user of the client computing device has set forth a comment about a portion of the file, the comment set forth in a computer-executable application executing on the client computing device that is usable to edit the file; and
updating the activity feed to include an entry that is representative of the comment being set forth about the portion of the file.

14. The method of claim 13, wherein the entry comprises:
the comment; and
the portion of the file.

15. The method of claim 10, wherein the activity feed comprises a text entry field that is configured to receive comments about the entity, the method further comprising:
receiving a comment set forth about the entity in the text entry field of the activity feed; and
updating the activity feed to include an entry that includes the comment.

16. The method of claim 10, wherein the plurality of entries includes an entry that indicates that a second user set forth a comment to the entity.

17. The method of claim 10, wherein the plurality of entries includes an entry that indicates that a second user accessed but did not modify the entity.

18. A computer-readable storage medium comprising instructions that, when executed by a processor, cause the processor to perform acts comprising:
receiving an indication that a user of a client computing device has authenticated with a file hosting application executing at a file hosting server, the file hosting application is configured to simultaneously provide access to a file hosted at the file hosting server to users who are authorized to access the file;
in response to receiving the indication that the user of the client computing device has authenticated with the file hosting application, causing a plurality of file identifiers to be displayed on a display of the client computing device, the plurality of file identifiers representative of a plurality of files hosted at the file hosting server;
receiving an indication from the client computing device that the user has selected a file identifier in the plurality of file identifiers;
in response to receiving the indication from the client computing device that the user has selected the file identifier in the plurality of file identifiers, causing an activity feed for a file represented by the file identifier to be displayed on the display of the client computing device, wherein the activity feed is displayed on the display concurrently with the plurality of file identifiers, the activity feed comprises a plurality of entries that are representative of a plurality of activities undertaken with respect to the file over time, the plurality of entries arranged in accordance with a chronology in which the activities were undertaken with respect to the file over time, wherein each entry in the plurality of entries comprises:
  data that identifies a type of activity represented by the entry;
  an identity of a user who performed the activity represented by the entry; and
  data that identifies a time that the activity was performed with respect to the file;
receiving a request to filter entries in the activity feed based upon the type of activity; and
in response to receiving the request, filtering entries in the activity feed such that the activity feed includes only entries that are representative of activities of the type of activity.

19. The computer-readable storage medium of claim 18, wherein the plurality of entries include an entry that indicates that a user who is authorized to access the file has caused the file to be shared, by way of the file hosting application, with at least one other user who previously was not authorized by the file hosting application to access the file.

20. The computer-readable storage medium of claim 18, wherein the activity feed comprises a text entry field that is configured to receive comments about the file, the acts further comprising:
receiving a comment set forth about the file in the text entry field of the activity feed; and
updating the activity feed to include an entry that includes the comment.

* * * * *